United States Patent [19]

Smets et al.

[11] Patent Number: 4,506,125

[45] Date of Patent: Mar. 19, 1985

[54] GLAZING PANELS AND THEIR BONDING

[75] Inventors: Jacques Smets, Brussels; Michel Laurent, Nivelles, both of Belgium

[73] Assignee: Glaverbel, Brussels, Belgium

[21] Appl. No.: 498,572

[22] Filed: May 26, 1983

[30] Foreign Application Priority Data

May 28, 1982 [GB] United Kingdom ................ 8215715

[51] Int. Cl.³ ............................................ B23K 13/02
[52] U.S. Cl. .............................. 219/10.53; 219/10.43; 219/10.57; 219/10.79; 156/272.2; 156/379.6; 156/109
[58] Field of Search ............... 219/10.53, 10.41, 10.43, 219/10.57, 10.79; 156/109, 272.2, 379.6

[56] References Cited

FOREIGN PATENT DOCUMENTS

| | | |
|---|---|---|
| 831166 | 3/1960 | United Kingdom . |
| 1167193 | 10/1969 | United Kingdom . |
| 1227943 | 4/1971 | United Kingdom . |
| 1307843 | 2/1973 | United Kingdom . |
| 1506282 | 4/1978 | United Kingdom . |
| 1585823 | 5/1978 | United Kingdom . |
| 1589878 | 5/1981 | United Kingdom . |

Primary Examiner—Roy N. Envall, Jr.
Assistant Examiner—M. M. Lateef
Attorney, Agent, or Firm—Spencer & Frank

[57] ABSTRACT

A method of manufacturing a polygonal glazing panel comprising sheets 61, 62 which are joined together along the margin of the panel using heat-activatable bonding medium 66,67 which is electrically conductive and/or in contact with electrically conductive material 63 comprised within the panel and which is activated in situ by induction heating is characterized in that for the induction heating use is made of a polygonal inductor loop each of whose sides 50, 51, 52, 53 and 68 comprises a conductor or conductors of tubular bar or of rod form, the loop being spaced from the work 61 to 67 and so disposed in relation to the margin of the work that the bonding medium 66, 67 is heated simultaneously at all positions along the joint or joints to be formed. In apparatus for performing this invention the induction heating means comprises an inductor in the form of a polygonal loop which can lead around the edge of a panel assembly, each side of the loop being formed by a conductor or conductors of tubular bar or of rod form and at least one side of the loop is movable relative to one or more other sides of the loop.

26 Claims, 7 Drawing Figures

GLAZING PANELS AND THEIR BONDING

BACKGROUND OF THE INVENTION

The present invention relates to a method of manufacturing a glazing panel comprising sheets which are joined together along the margin of the panel using heat-activatable bonding medium which is electrically conductive and/or in contact with electrically conductive material comprised within the panel and which is activated in situ by induction heating.

Such a method is applicable for example in the manufacture of hollow glazing panels, the sheets being bonded together by intervening spacing means. The spacing means may for example comprise a metal spacer rail or rails which is or are bonded to metallised margins of the sheets by solder which is melted in situ. As an alternative a heat-activatable adhesive composition can be used for bonding the sheets to a spacer of metal, glass or other material. As a further alternative the spacing means may be constituted by the heat-activatable bonding material itself.

Bonding by induction heating is known per se in several fields. For example British Patent Specification No. 1 167 193 is mainly concerned with plastics packaging. In that specification the parts to be joined are pressed between an inductive loop and a non-magnetic electrically conductive reinforcing member which serves to concentrate the magnetic field produced by the loop in the region of conductive material distributed along the joint line to heat it and soften the adjacent plastics materials so that the plastics parts become fused or sealed together. There is passing reference to use of the invention with cardboard stock, wood, rubber, glass and paper in addition to plastics material, though no detail of any such use is given. In any event the process and apparatus of British Patent Specification No. 1 167 193 would not be suitable for series production of glazing panels, and in particular of hollow glass panels, in view of the repeated contact of the apparatus with a panel.

As evidenced by the prior art, attempts to use induction heating in the manufacture of glazing panels have followed a rather different course. However most of these prior proposals are of a general nature in the sense that they refer to induction heating as one of the possible ways in which jointing material can be heated in situ, but give at best very little information concerning the form of induction heating apparatus and the procedures which should be used. Among various proposals to join assembled components of a hollow glazing panel by using an induction heating step are those described in British Patent Specifications Nos. 831 166, 1 307 843 and 1 506 282.

In the above mentioned patent specifications: British Pat. No. 831 166 simply states that the assembled components, in that case glass panes and an intervening copper spacer strip, can be placed on a conveyor, moved into a tunnel oven wherein the work assembly is raised to 500° C. and then moved past an alternating magnetic field whereby the temperature of the spacer strip is raised by the induced current sufficiently to fuse the edges of the ring to the glass panes. In this method the heating is sufficient to melt the portions of glass which are in contact with the metal ring so that no separate bonding medium is needed, but the specification does indicate that the metal can be coated with a layer of a bonding agent such as easy-melting powdered glass or borax, in order to improve the wetting of the metal by the molten glass.

British patent specification No. 1 307 843 states that bonding medium for bonding the glass panels of a double glazing panel to an intervening metal spacer can be activated in situ by subjecting the assembly to an electrical heating treatment such as induction or resistance heating; but it does not give any information concerning suitable electrical heating apparatus or procedures.

British Patent specification No. 1 506 282, which likewise refers to heating of the spacer rail or rails of a double glazing panel by means of an inductive eddy current, does include an outline of possible procedures. The specification says that the spacer rail or rails can be heated as a whole by means of inductive eddy currents and goes on to state that satisfactory results may be achieved in many cases if a relatively large portion of the spacer rail is gradually heated by means of induced eddy currents to the temprature necessary for the joint sealing and the heat is thereafter allowed to progress successively and gradually along the spacer rail, e.g. by a slow successive relative displacement of the eddy current source with respect to the spacer rail in the longitudinal direction. In a specific embodiment use is made of high-frequency coils and a longitudinal portion of the spacer rail corresponding substantially to the diameter of the high-frequency field is slowly heated to the jointing temperature before the panel assembly is displaced to conduct its adjacent edge areas successively through such field.

When assessing the suitability of an inductive heating method for use in the production of panel joints under industrial mass production conditions, various factors need to be considered. Most important of course is the quality of the panel joints and the reliability with which a given joint standard can be reproduced. The panel joints must not only have a certain minimum strength to withstand forces imposed on the panel in use, but they should be of uniform quality around the panel. Furthermore, in series production of panels, the standard of the joints formed must be consistent from panel to panel. Other important factors are the time required for making the joints of each panel and the facility with which the work handling operations at the heating station can be accomplished and mechanised if required. Yet another important factor is the cost of the energy consumption involved in generating the necessary heat.

SUMMARY OF THE INVENTION

The object of the present invention is to provide an induction heating method which can be applied under industrial working conditions to produce high quality joints yet which is economical in terms of time and energy consumption and of the equipment which is required.

According to the present invention there is provided a method of manufacturing a polygonal glazing panel comprising sheets which are joined together along the margin of the panel using heat-activatable bonding medium which is electrically conductive and/or in contact with electrically conductive material comprised within the panel and which is activated in situ by induction heating, characterised in that for said induction heating use is made of a polygonal inductor loop each of whose sides comprises a conductor or conductors of tubular bar or of rod form, the loop being spaced from the work and so disposed in relation to the margin of the work that the bonding medium is heated simultaneously at all positions along the joint or joints to be formed.

The empolyment of an inductor loop formed by one or more tubular bar or rod conductors and arranged in the specified manner has been found to be conductive to the production of joints of uniformly good quality. The eddy current field generated by the loop is very effectively distributed in relation to the work so that the generated heat-power consumption ratio is quite high.

A method according to the invention is more economical than the use of a tunnel oven and more rapid than the use of a travelling eddy current source. Furthermore a method according to the invention using tubular bar or rod conductors presents advantages of economy even over a method in which the loop is formed by helically wound coils.

A tubular bar or rod conductor for use in the method of the invention may be constituted as a single, solid tube or rod or by a multiplicity of conductive elements e.g. braided or twisted together.

Another very important advantage of the invention is that the peripheral jointing of panel sheets can be effected very rapidly.

The method according to the invention can be performed by means of induction heating apparatus of relatively simple form regardless of the shape of the panel being produced. For example in the manufacture of a polygonal panel, us can be made of a loop of similar shape comprising straight tubular bar conductors forming the sides of the loop polygon. The loop does not have to be displaced relative to the work during the heating of a joint. The inductor loop can easily be held in the required working position at a heating station, e.g. by supporting means at the ends of the conductor or conductors and/or by a small number of supports located between those ends.

The invention can be employed in the manufacture of panels in which the sheets are bonded to an intervening spacer strip or strips, e.g. a metal spacer rail or rails. A single spacer rail can be used if it is bent to form a frame of the same shape as the panel. Alternatively, a pluralty of spacer rails can be used in end to end relationship. For example, in the manufacture of a polygonal panel there may be a straight spacer rail extending along each margin of the polygon. Such spacer rails can be endwise connected together e.g. by corner pieces. When using a metal spacer rail or rails it is not necessary for the bonding medium to be electrically conductive.

In the manufacture of panels with one or more inter-sheet spacer strips the induction heating method according to the invention can be employed for bonding both sheets to the spacer(s) or for bonding only one of the sheets thereto the other sheet being bonded to the spacer(s) by some other method. When the invention is employed for bonding both sheets to a spacer or spacers, both sheets can be bonded to the spacer(s) simultaneously, using the one induction heating step, or they can be bonded to the spacer(s) in successive operations.

The invention can also be employed in the manufacture of panels in which the sheets are directly bonded together by the heat-activatable bonding medium. If the panel is one wherein the sheets are joined in spaced relationship, this means in effect that the bonding medium serves as inter-sheet spacing means.

The inductor loop may be arranged above or below the work, but it preferably follows a course around the perimeter of the work since this has been found best for efficient power transfer.

In the most preferred embodiments of the invention, two sheets are simultaneously joined to inter-sheet spacing means disposed along the margin of the panel by a single induction heating step in which the inductor loop is arranged so that the plane of the loop is located substantially symmetrically between said sheets. Such embodiments have the important advantage that the best coupling between the loop and the work is achieved so that uniform bonding of both sheets can be effected very rapidly.

Advantageously, the loop has a said symmetrical location in relation to the thickness of the work and the height (measured parallel with the thickness dimension of the work) of the conductors composing the loop is less than the inter-sheet spacing. It has been found that under these circumstances the power consumption for a given heating effect along the courses of the joints is less than when using conductors whose said dimension is equal to or greater than said spacing.

Preferably the inductor is arranged so that (as viewed perpendicularly to the plane of the loop, by which is meant the plane containing the longitudinal axis of the inductor) the path of the inductor is at a substantially uniform spacing from the course of the joint(s) to be formed. This condition is usually most favourable for efficient use of the power source.

The size of the gap between the conductor loop and the work has an effect on the power consumption for bonding any given panel.

Preferably, the gap between the joint or joints to be formed and the conductors at all points along the course of the joint or joints is less than the height of the conductors composing the loop. Alternatively, or in addition, it is preferred that the said gap between the joint or joints to be formed and the conductors of the loop is less than 30 mm.

In the most preferred embodiments of the invention, the electrically conductive material which constitutes or is in contact with the bonding medium forms a continuous conductive path around the margin of the panel. This gives a much better power transfer from the inductor loop since the loop and conductive material then act as a transformer and the conductive material is heated by circulating current.

The conductors are preferably of rectangular section.

Preferably the inductor loop comprises a plurality of conductors which are relatively displaceable for varying the size of the loop. An important advantage of an adjustable loop is that it can be used for heating bonding medium along the margin of a second panel different in size from the first panel, after adjusting the loop to suit that second panel. An adjustable loop has the further advantage that when manufacturing panels of a given size, the gap between the inductor and the course of the joint to be formed can be varied for varying the heating effect, e.g. to suit different heat-activatable bonding media, and to achieve the best coupling between the loop and the work. This is especially important for rapid series production of panels of different sizes.

In optimum embodiments of the invention, use is made of a rectangular loop composed of conductors which are relatively displaceable so that each of the length and breadth dimensions of the rectangle can be varied.

In certain embodiments of the invention adjacent conductors are releasably or displaceably held in electrical contact with each other so that the conductors can be arranged in different relative positions for varying the dimensions or the dimensions and the shape of the loop. The contacts between the conductors may be of a kind permitting relative sliding movement of adjacent conductors. Alternatively releasable clamp connections can be employed.

In other embodiments of the invention, the loop comprises a plurality of tubular bar or rod conductors electrically connected in series by electrical conductors which are flexible so that they permit relative movement of said tubular bars or rods for varying the dimensions or the dimensions and the shape of the loop. Use can be made of such flexible connecting conductors instead of or in addition to releasable or displaceable contacts as above referred to. When both types of connections are used the flexible conductors preserve the integrity of the loop in the event of failure or impairment of any of the releasable contacts.

Each of a plurality of tubular bar conductors forming the loop can be independently cooled by passage of fluid coolant along the tube.

The tubular bar conductor or conductors can be of any suitable material. In a particular embodiment use is made of tubular bars made of copper and plated with chromium. For making direct bar-to-bar contact it is very suitable to provide the bars or certain of the bars with attached contact portions, e.g. portions made of silver.

Any of a large variety of bonding media can be used in carrying out the invention.

In some embodiments of the invention, solder is used as the heat-activatable bonding medium. Preparatory to being soldered the glazing sheets should be metallised along the course of the joint to be formed. It is an advantageous procedure to apply solder along the metallised sheet margins preparatory to assembling the sheets or the sheets and the separate spacer(s) if such is or are used, ready for the induction heating step. Such preapplications of solder are recommended for promoting high joint quality. The use of solder joints has a particular application for example in the manufacture of double glazing units comprising sheets of glass connected to an intervening metal spacer rail at the margin of the unit.

In other methods according to the invention the bonding medium used is a heat-activatable adhesive. For example a type of hot-melt adhesive can be used, in which case the heat-activation is no more than a melting or softening operation and the bonding occurs on cooling of the adhesive. Suitable heat-sensitive adhesive compositions include polymeric compositions comprising a copolymer of ethylene with one or more hydroxy or epoxy lower aliphatic monoesters of acrylic or methacrylic acid, or with methacrylic acid and with a vinyl ester or an acrylic or methacrylic ester, as disclosed in United Kingdom patent specifications Nos. 1 227 943 and 1 307 843.

As further examples of types of heat-activatable bonding media which can be used in carrying out the invention are mentioned curable elastomeric compositions based on one or more butyl rubbers either alone or in combination with other polymers such as ethylene/-vinyl acetate copolymers or polyisobutylene, compositions based on one or more ethylene/propylene terpolymers particularly terpolymers of ethylene and propylene with a diene e.g. polyisobutylene, and compositions based on a butadiene/styrene copolymer or a butadiene/acrylonitrile copolymer. Useful information concerning these types of bonding media and cross-linking or vulcanisation agents for use in conjunction therewith is contained in United Kingdom patent specification No. 1, 589 878.

Electrically conductive elements may be present in external surface contact with a heat-activatable adhesive composition as above referred to, along the course of the joint. For example, in certain embodiments of the invention use is made of a metal spacer rail, and this strip is bonded to the panel sheets by said adhesive composition. Alternatively the panel sheets can be connected in spaced relation by means of a spacer strip or ribbon which is composed of a said adhesive composition, the margins of the sheets bearing electrically conductive coatings e.g. coatings of copper, in contact with such strip or ribbon.

In certain cases, electrically conductive material can be incorporated in the heat-activatable adhesive composition instead of or in addition to providing electrically conductive material in external surface contact therewith. For example, a vulcanisable rubber-type adhesive composition can incorporate particles of ferromagnetic material such as material selected from: iron, nickel and cobalt and their alloys e.g. an Fe-Ni, Ni-Cr, Ni-Mn, Ni-Cr or Ni-Mn alloy; carbon copper, silver, gold, aluminium, silicon and their alloys; and barium ferrite.

The inter-sheet bond between the sheets of the panel can be peripherally continuous, or it may be interrupted at one or more local zones. Such an interruption may for example be for the purpose of enabling gas to have access to the inter-sheet space.

The invention also extends to apparatus suitable for performing a method according to the invention as above defined. Apparatus according to the invention comprises induction heating means suitable for induction heating heat-activatable bonding medium present along the margin of an assembly of facing polygonal sheets to cause said sheets to be bonded together, characterised in that said induction heating means comprises an inductor in the form of a polygonal loop which can lead round the edge of a said assembly, each side of said loop being formed by a conductor or conductors of tubular bar or of rod form, and wherein at least one side of the loop is movable relative to one or more other sides of the loop.

Preferably, each said conductor is constituted as a fluid-tight tube. Preferably the apparatus comprises means for conducting fluid coolant through each tube, independently of the other tube of tubes. Such a cooling system is quite easy to arrange notwithstanding the fact that the bars may be and preferably are relatively displaceable.

Preferably conductors of adjacent sides of the loop are releasably or displaceably held in electrical contact with each other. Alternatively or in addition the loop conductors can be connected in series by electrical conductors which are flexible so that they permit relative movement of said loop conductors for varying the dimensions of the shape of the loop.

Each side of said loop is preferably movable relative to each other side of the loop so that the heating means of the invention can be used for bonding glazing panels of different sizes and/or shapes.

In a particularly preferred form of apparatus, at least one side of the inductor loop is bodily movable parallel with itself and relative to one or more other sides of the loop. For example in a rectangular loop, each of two loop components forming adjacent sides of the loop may be bodily displaceable towards and away from its respective opposite side, while those two opposite sides define a spatially fixed corner zone. Alternatively, all four sides of such a rectangular loop may be bodily displaceable so that the shape, size and position of the loop can be varied.

The loop conductors can be supported by rigid members forming parts of a support frame.

Preferably, at least one side of the inductor loop is carried by a guided displaceable beam.

Said conductors are preferably of rectangular section.

BRIEF DESCRIPTION OF THE DRAWING

Certain embodiments of the invention will now be described by way of example with reference to the accompanying diagrammatic drawings, in which.

DESCRIPTION OF THE PREFERRED EMBODIMENTS

Figure 1:
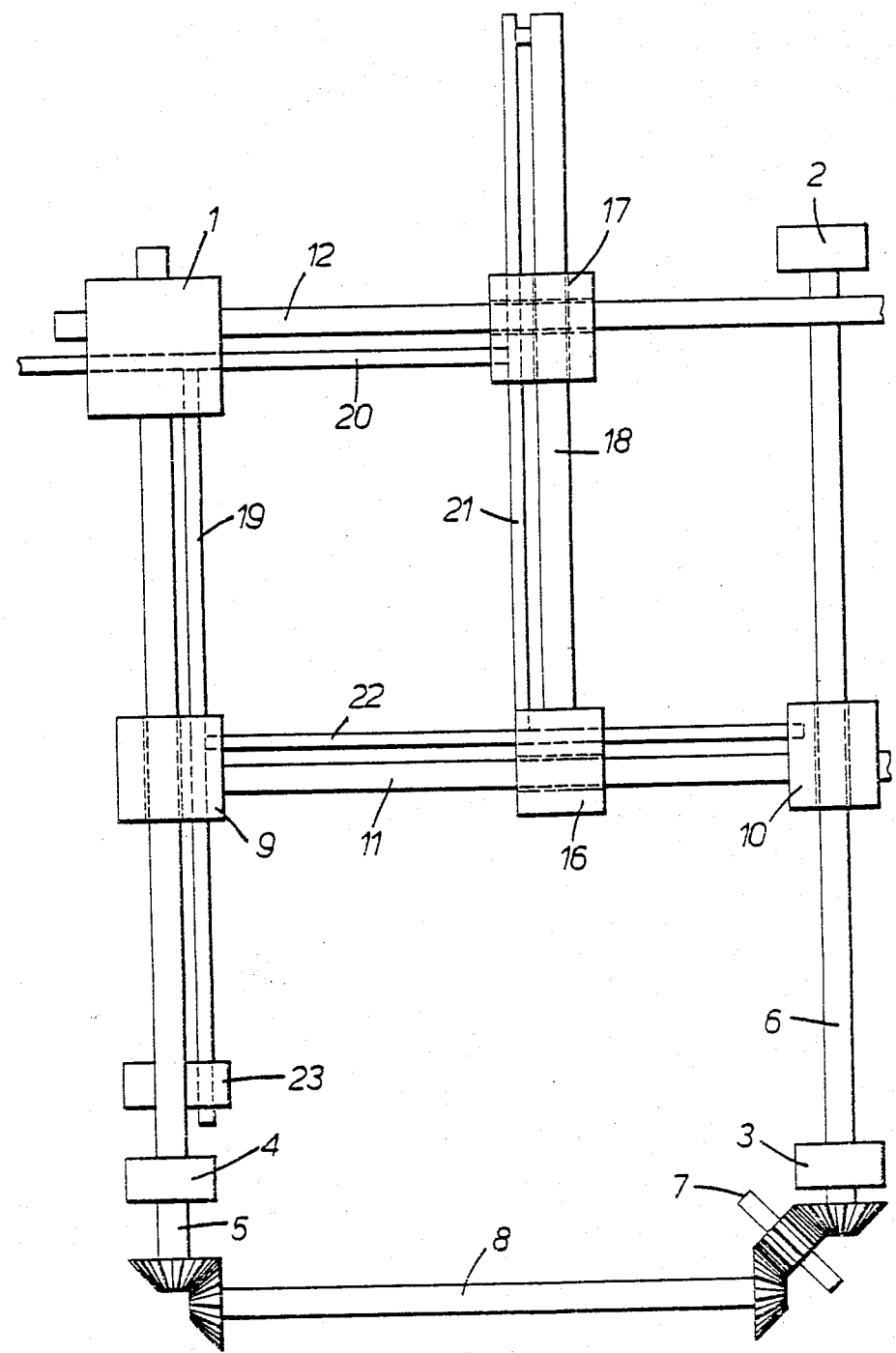
FIG. 1 is a plan view of a first embodiment of the invention.

In FIG. 1, a fixed frame (not shown) of the apparatus carries fixed bearings 1, 2 and 3, 4 respectively for a pair of longitudinal worms 5, 6 which are connected to a common drive shaft 7 by bevel gears and a bevel gear transmission shaft 8 so that they may be rotated in synchronism.

Worm follower carriages 9, 10 are mounted on the two longitudinal worms 5, 6 for longitudinal movement along them and a transverse worm 11 is suspended from these carriages for bodily displacement therewith.

A second transverse worm 12 is mounted in the fixed bearing 1 and another fixed bearing (not shown) located near the other end of such worm.

Worm follower carriages 16, 17 are mounted on the transverse worms 11, 12 for transverse movement along them.

The fixed bearing 1 and the carriages 9, 16 and 17 form the corners of a rectangular area the size of which can be varied. By rotation of the worms 5 and 6 by the drive shaft 7, the carriages 9 and 16 can be displaced towards or away from the bearing 1 and carriage 17. By rotation of the transverse worms 11 and 12 the carriage 16 and 17 can be displaced towards or away from the bearing 1 and carriage 9. The rotation of worms 11 and 12 is effected by synchronised electric motors (not shown).

A rail 18 has one end fixed to carriage 16 and is slidably supported in the carriage 17.

The said frame corners assist in the support of four stiff conductors 19, 20, 21, 22. The first of these conductors 19 is supported between the fixed bearing 1 and another fixed bearing 23 and runs parallel to and beneath the first longitudinal worm 5. The second conductor 20 is slidably supported by the fixed bearing 1 and has one end supported by the carriage 17. The third conductor 21 has one end supported by the carriage 16, the other end by the rail 18 and is slidably supported by the carriage 17. The fourth conductor 22 is supported between the carriages 9, 10. The worms 5, 11 and 12 and the rail 18 accordingly constitute sides of a rigid support frame for the four conductors 19–22. The conductors 19 to 22 all lie at the same level. If desired they may be connected to their supports by jacks so that they are vertically movable.

The ends of the conductors 20, 21, 22 respectively supported beneath the worm follower carriages 17, 16, 9 are provided with slide contacts (not shown) for forming an electrical contact with a median portion of the cyclically adjacent conductor respectively 21, 22, 19. A current input terminal (not shown) is connected to the end of the first conductor 19, beneath the fixed bearing 1. A second input terminal is connected to the second conductor 20 in the vicinity of bearing 1. For example, such second input terminal can be a slide contact for conductor 20, mounted beneath the fixed hearing 1.

It will be appreciated therefore that the portions of conductors 19, 20, 21, 22 which at any given time border a rectangular area whose corners are at the locations of bearing 1 and carriages 9, 16 and 17 in the aspect of FIG. 1 form a rectangular loop and that the size of the loop can be varied by rotating the longitudinal worms 5 and 6 and/or by rotating the transverse worms 11, 12 as above referred to.

For carrying out a method according to the invention by means of the apparatus represented in FIG. 1, the components to be jointed are placed on a support (not shown) so that the peripheral joint or joints to be formed are in or close to the plane of the conductors 19 to 22, the loop formed by such conductors is adjusted to a size just a little greater than the assembly, so that said conductors follow a path close to the marginal course of the joint to be formed, and the induction heating power source is switched on for a time sufficient for activating the heat-activatable bonding medium.

It is particularly convenient for the work support to be formed by a conveyor which runs parallel to the longitudinal worm 5 and towards the transverse worm 12, or parallel to the transverse worm 12 and towards the longitudinal worm 5. A positioning stop may then be provided beneath the fixed bearing 1 to locate a leading corner of the work in the corner angle formed by the first and second conductors 19, 20.

Figures 2, 3:
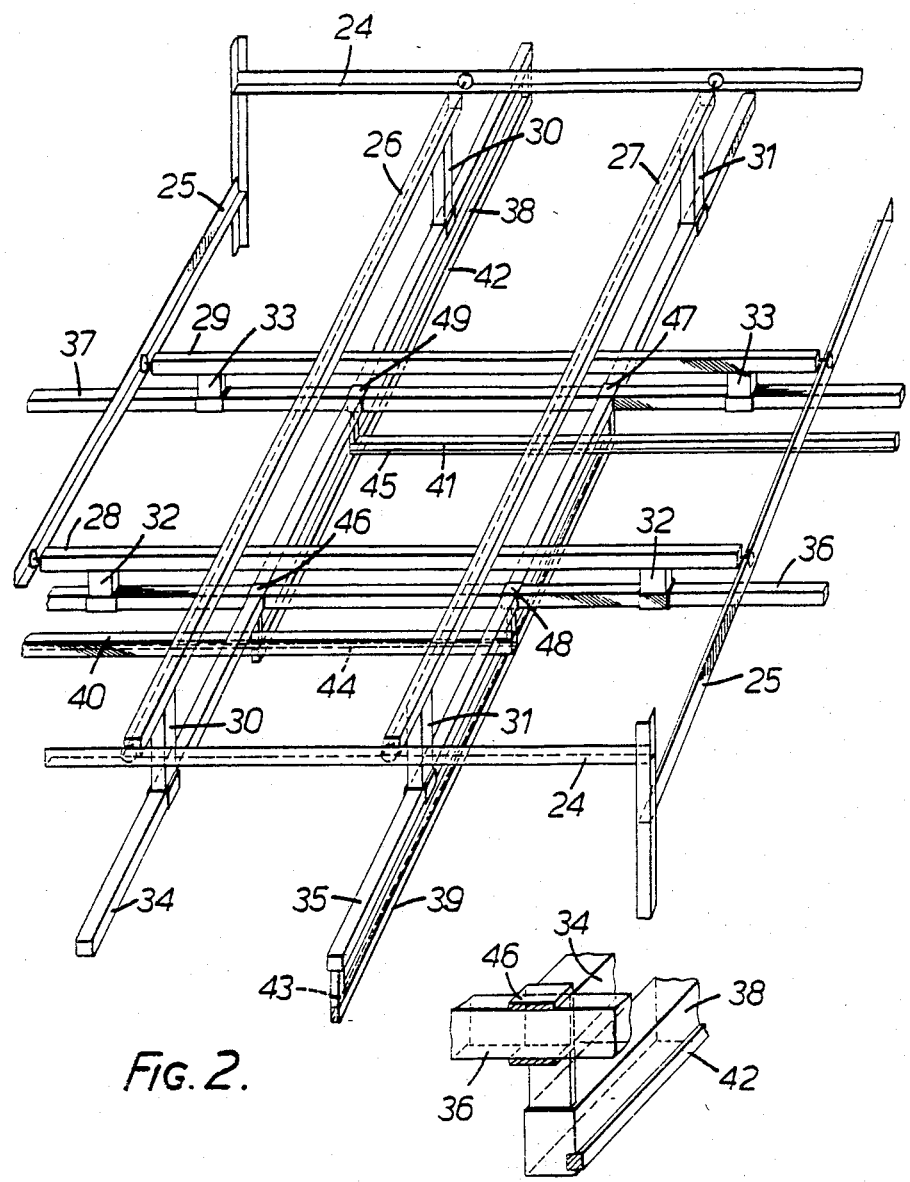
FIG. 2 is an isometric view of a second embodiment.
FIG. 3 is a detail view of part of FIG. 2.

Another embodiment of the invention is illustrated in FIGS. 2 and 3. A frame comprises a pair of fixed portals 24 linked by longitudinal struts 25. A pair of parallel longitudinal support beams 26, 27 is mounted on the portals 24 for transverse movement, and a pair of parallal transverse support beams 28, 29 are mounted on the longitudinal struts 25 for movement along them. Each support beam 26, 27, 28, 29 has fixed near its ends a pair of downwardly projecting king posts respectively 30, 31, 32, 33 terminating in slides which carry slide bars respectively 34, 35, 36, 37 and each slide bar carries fixed beneath it a mount 38, 39, 40, 41 carrying a rigid conductor respectively 42, 43, 44, 45. Each slide bar includes a slide opening through which a cyclically adjacent slide bar passes. Thus slide bar 34 includes a slide opening 46 through which slide bar 36 passes. (This is shown to an enlarged scale in FIG. 3). Slide bar 35 has a slide opening 47 for slide bar 37, slide bar 36 a slide opening 48 for slide bar 35 and slide bar 37 has a slide opening 49 for slide bar 34. The conductors 42 to 45 form a rectangular loop. Such conductors make sliding contact with each other at the corners of the loop. In this apparatus the rectangular inductor loop formed by the conductors 42 to 45 can not only be varied in size or in size and shape, but it can also be bodily displaced in directions parallel and normal to the portals 24. This enables the work to be located at different positions.

Figure 4:
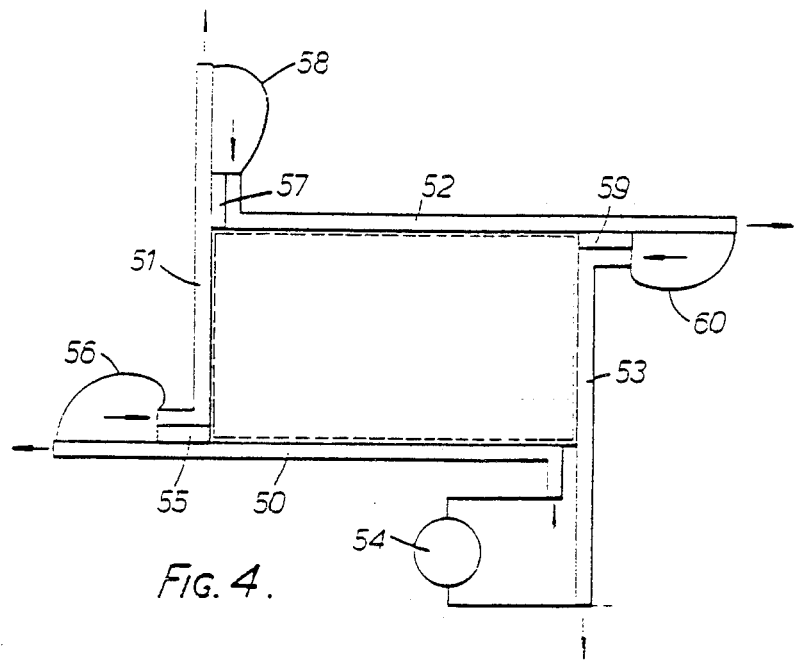
FIG. 4 is a schematic plan view of an inductor loop.

FIG. 4 indicates diagrammatically four rigid conductors 50, 51, 52, 53 which may be supported as described with reference to FIGS. 1 or 2. Each conductor may suitably be formed of chromium plated copper tubing to allow the circulation of a coolant such as water as indicated by the arrows. A high frequency electric current generator 54 is switchably connected to a current input end of the first conductor 50 adjacent a median portion of the fourth conductor 53. The second conductor 51 has at one end a slide 55 for making sliding electrical contact along the first conductor 50. That end of the second conductor 51 is also connected to the first conductor 50 at the opposite end to the current source 54 by a flexible shunt 56 in case the slide contact 55 should deteriorate. A slide 57 and shunt 58 similarly connect the third conductor 52 to the second 51 while the fourth conductor 53 is connected to the third conductor 52 by a slide 59 and a shunt 60. The other end of the fourth conductor 53 is connected to the power source 54. The position of a panel assembly ready for induction heating within the loop formed by conductors 50-53 is shown in broken lines.

Figure 5:
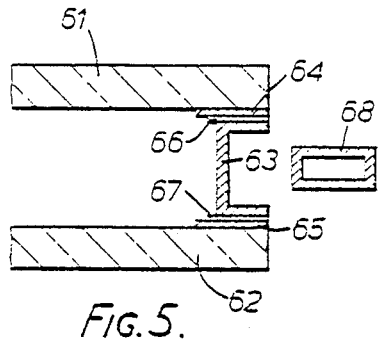
FIGS. 5 to 7 show details of three different panel assemblies.

FIG. 5 shows in cross-section a margin of a glazing panel assembly and one side of an inductor loop in the position which it occupies during induction heating of the bonding medium for forming the inter-sheet joints. The glazing panel assembly comprises two glass sheets 61, 62 and an intervening marginal spacer rail 63 of U-shaped cross-section. Prior to the assembling of the components the margins of the glass sheets are coated with copper on their inside faces. These copper coatings (not shown) were then over-coated with solder layers 64, 65 of about 200 microns in thickness. The outside faces of the opposed flanges of the spacer rail were coated with solder layers 66, 67 of about 20 microns in thickness. Following assembly of the coated components in the illustrated relationship, the peripheral joints are induction-heated around the entire margin of the assembly. For this purpose, use can be made of a stiff inductor loop 68 comprising four end-to-end connected rectangular section tubes each extending along one edge of the assembly. The loop can be cooled by circulating coolant through the tubing.

It is very advantageous to employ a spacer rail with flanges which can be soldered in facing relationship to the glass sheets. It is easier to form good quality joints by means of solder layers between the sheets and parallel flanges than it is to form solder beads between the sheets and a spacing web disposed edgewise-on to the sheets. Moreover the use of pre-applied solder layers is particularly well suited to the in situ melting of the soler by means of an inductor loop in accordance with the invention.

In order to form a joint which is very resistant to impairment in consequence of stresses imposed by forces tending to flex one or both of the glass sheets or of temperature gradients across the panel, it is very beneficial to form the spacer from a strip of metal whose modulus of elasticity (Young's modulus measured in compression) is at least 5000 kg/mm$^2$. Glazing units incorporating such a spacer are described and claimed in United Kingdom Pat. No. 1 585 823 and that specification gives examples of very suitable spacer strip materials. Such spacers can be used in making a glazing panel by a method according to the present invention and that earlier patent specification is incorporated herein as reference.

Figure 6:
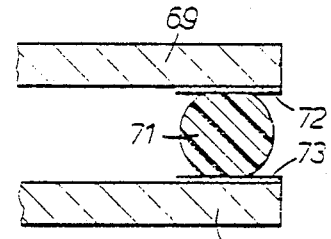

An alternative type of joint which can be formed by means of the invention is shown in FIG. 6. The glass sheets 69, 70 are bonded together by means of a spacer strip 71 formed by extrusion of a heat-activatable composition having the following ingredients:

|  | Parts by Weight |
| --- | --- |
| Butyl LM (a vulcanisable isoprene/isobutylene copolymer marketed by Esso) | 100 |
| Butyl 268 (another such copolymer marketed by Esso) | 8 |
| EVA (a hot-melt adhesive marketed by Union Carbide and comprising an ethylene/vinyl acetate copolymer containing 28% by weight vinyl actate units) | 30 |
| "Methylon" AP 108 (phenolic resin tackifier marketed by General Electric) | 3 |
| "Escorez" (hydrocarbon resin tackifier marketed by Esso | 5 |
| "Caloxol W 5 G" (calcium oxide desiccant marketed by Sturge Chemicals) | 8 |
| "Levilite" (silica gel desiccant marketed by Rhone Progil) | 20 |
| Molecular sieve desiccant KAlSiO$_3$ (marketed by Union Carbide) | 5 |
| "Tonox" (vulcanisation inhibitor comprising p, p$^1$-diaminodiphenylmethane and m.aminoaniline, marketed by Uniroyal) | 2 |
| GMF (p-quinone dioxime) vulcanising agent marketed by Uniroyal) | 3 |
| OMYA EXHl chalk diluent marketed by Omya | 10 |
| Carbon black filler (marketed by Venderbilt) | 5 |
| PbO$_2$ (vulcanisation accelerator) | 9 |
| "Shellflex" plasticiser marketed by Shell | 4.5 |

The extrudable composition can be made by mixing together the mutually soluble butyl polymers at 130° C. and after discontinuing the mixing, adding all of the other ingredients with the exception of the vulcanisation accelerator and plasticiser. The vulcanisation accelerator is dispersed in the plasticiser and the resulting suspension then mixed with the mixture of the other ingredients at 60° C. The resulting composition can be extruded at 60° C. to form a strip having a tensile strength of 1 kg/cm$^2$ and an elongation at break exceeding 800%. The strip can be laid progressively along the margin of the sheet 70 at any suitable time after manufacture of such strip. The sheet 69 can then be located on the strip and the assembly can be subjected to roller pressure to bring the sheet spacing to the required value.

Because in this embodiment there is no metal spacer in which heat can be generated by the eddy current field, the margins of the facing surfaces of the glass sheets are pre-coated with layers 72, 73 of copper. The heat-activatable composition is heated in situ by an induction heating loop which can occupy a position relative to the assembly similar to that of the inductor loop in FIG. 5. The heat generated in the copper layers by the field of the inductor induces the vulcanisation of the strip 71 in situ and bring about its simultaneous adherence to the copper layers. In a modification a copper wire was embedded in the centre of the strip 71. This increases the rate of vulcanisation of the core of the strip.

Figure 7:
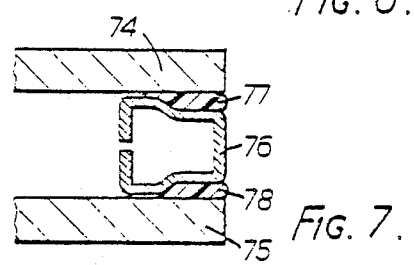

The panel assembly shown in FIG. 7 comprises glass sheets 74, 75 and an intervening metal spacer rail 76 of generally U-section. Quantities of heat-activatable adhesive are applied to form layers 77, 78 between the glass sheets and the opposed flanges of the spacer rail. The sides of the rail channel are stepped to form thicker receptive spaces for the adhesive over part of the width of the channel flanges. The adhesive is activated in situ by induction heating the adhesive via the rail 76. The inductor loop can be located round the assembly as in FIG. 5.

The heat-activatable adhesive composition used in the panel according to FIG. 6 can be used in the manufacture of a panel as represented in FIG. 7.

The following is a specific example of a method according to the invention.

EXAMPLE

A panel assembly as shown in FIG. 5 was formed. The panel area measured 40 cm×60 cm. Each of the two glass sheets 61 62 was 4 mm in thickness. The channel section spacer rail 63 was made of copper. The width of the channel (its dimension normal to the glass sheets) was 12 mm and the width of the flanges forming the opposed channel sides was 4 mm. The margins of the glass sheets were coated with copper on their inner faces as known per se in double glazing unit construction and the copper coatings as well as the exterior faces of the spacer rail flanges were pre-coated with solder before assembly of the sheets and spacer rail. For the induction heating operation a rectangular inductor loop formed from four rectangular section tubular bars made of chromium-coated copper was used. The outside cross-sectional dimensions of the bars were 9 mm×4 mm and they were orientated as shown in FIG. 5 with their wider (9 mm) faces normal to the planes of the glass sheets. The inductor was located so that at all points along the course of the loop the horizontal distance between the inductor and the edge of the panel assembly was 2 mm and the loop was disposed symmetrically with respect to a plane mid-way between the sheet planes.

For forming joints of good quality it is important for the solder to become molten but the molten state must not persist for more than a very short time otherwise there would be a risk of corroding the contacting metal, particularly the metallising coatings on the glass.

In this particular example it was found that solder bonding could be effected in a time of less than 10 seconds, the maximum power applied during that time being 10 KW, the generator frequency being 16.6 KHz.

From comparative tests it was found that if the loop were formed by tubular bars having 12 mm wide vertical faces (the faces disposed normally to the planes of the glass sheets) the power consumption required for forming joints of the same quality as those formed in the foregoing example would be appreciably higher.

We claim:

1. A method of manufacturing a polygonal glazing panel comprising sheets which are joined together by means of a joint along the margin of the panel using electrically conductive means including a heat-activatable bonding medium within the panel and which is activated in situ by induction heating, said method comprising effecting induction heating of the bonding medium, to form the joint, by means of a polygonal inductor loop having a plurality of sides each composed of at least one conductor of tubular bar or of rod form, the loop being spaced from the panel and so disposed in relation to the margin of the panel that the bonding medium is heated simultaneously at all positions along the joint to be formed.

2. A method according to claim 1, wherein the loop follows a course around the perimeter of the panel.

3. A method according to claim 2, wherein said step of effecting induction heating is carried out to simultaneously join two sheets to inter-sheet spacing means disposed along the margin of the panel by a single induction heating step in which the inductor loop is arranged so that the plane of the loop is located substantially symmetrically between said sheets.

4. A method according to claim 3, wherein the height measured parallel with the thickness dimension of the panel of the conductors composing the loop is less than the spacing between said sheets.

5. A method according to claim 1 wherein, as viewed perpendicularly to the plane of the loop, the path of the loop is at a substantially uniform spacing from the course of the joint to be formed.

6. A method according to claim 1 wherein the gap between the joint to be formed and the conductors at all points along the course of the joint is less than the height measured parallel with the thickness dimension of the panel of the conductors composing said loop.

7. A method according to claim 1, wherein the gap between the joint to be formed and the conductors of the loop at all points along the course of the joint is less than 30 mm.

8. A method according to claim 1, wherein the electrically conductive means includes electrically conductive material which forms a continuous conductive path around the margin of the panel.

9. A method according to claim 1, wherein the the conductors are of rectangular section.

10. A method according to claim 1, wherein the conductors constituting the sides of the loop are relatively displaceable for varying the size of the loop.

11. A method according to claim 10, wherein said loop is a rectangular loop composed of conductors which are relatively displaceable so that each of the length and breadth dimensions of the rectangle can be varied.

12. A method according to claim 10, wherein following said step of affecting induction heating, said loop is used, after adjusting its size, for effecting induction heating, electrically conductive material in the manufacture of a panel of a different size or a different size and shape.

13. A method according to claim 1, wherein said bonding medium is solder.

14. A glazing panel manufactured by a method according to claim 1.

15. A method according to claim 13, wherein the sheets which are joined together are two glass sheets having metallized margins, and said solder is initially provided as preformed coatings on the metallized margins.

16. A method according to claim 13, wherein said solder is initially provided as preformed coatings on a metal spacer interposed between two of the sheets and to which the sheets are assembled, by means of said coatings, for forming the panels in the form of a hollow glazing unit.

17. Induction heating means for induction heating a heat-activatable bonding medium present along the margin of an assembly of facing polygonal sheets to cause the sheets to be bonded together, wherein said induction heating means comprises an inductor in the form of a polygonal loop positioned to extend around the edge of such an assembly, each side of said loop being formed by at least one conductor of tubular bar or of rod form, and wherein at least one side of said loop is movable relative to at least one other side of said loop.

18. Induction heating means according to claim 17, wherein each said conductor is constituted as a fluid-tight tube.

19. Induction heating means according to claim 18, further comprising means connected for conducting fluid coolant through each tube, independently of the other tubes.

20. Induction heating means according to claim 17, wherein conductors of adjacent sides of the loop are releasably or displaceably held in electrical contact with each other.

21. Induction heating means according to claim 17, wherein each side of said loop is movable relative to each other side of said loop.

22. Induction heating means according to claim 17, wherein at least one side of said loop is bodily movable parallel with itself and relative to at least one other side of said loop.

23. Induction heating means according to claim 21, further comprising a guided displaceable beam carrying at least one side of said loop.

24. Induction heating means according to claim 17, wherein said conductors are of rectangular section.

25. Induction heating means according to claim 17, wherein said heat-activatable bonding medium comprises means for providing a closed conductive path around said margin.

26. Induction heating means according to claim 17, further comprising means contacting said heat-activatable bonding medium for providing a closed conductive path around said margin.

* * * * *